Figure 1:
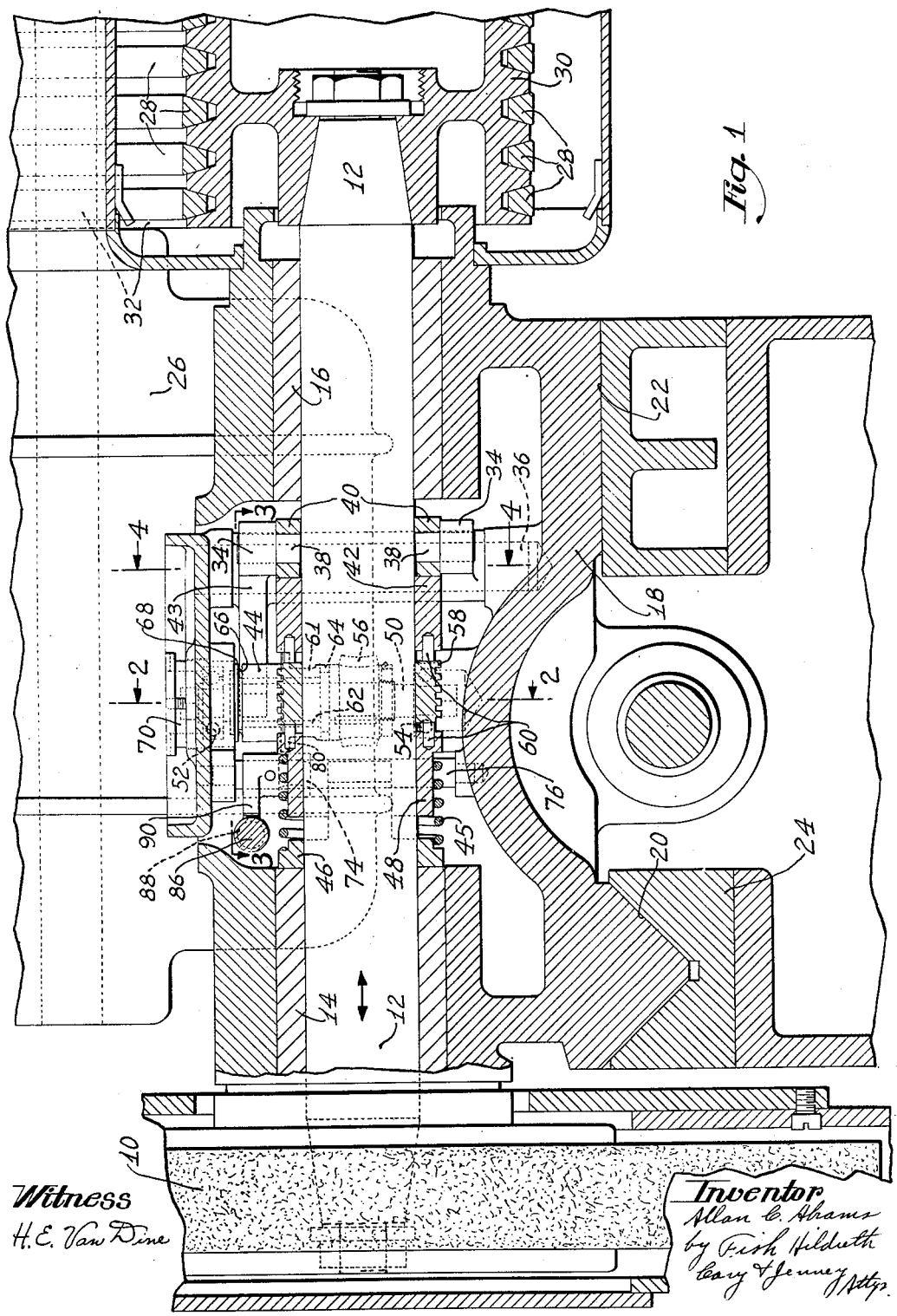

June 20, 1939.　　　　A. C. ABRAMS　　　　2,163,443

GRINDING WHEEL RECIPROCATING MECHANISM

Filed Nov. 14, 1935　　　　2 Sheets-Sheet 1

Witness
H. E. Van Dine

Inventor
Allan C. Abrams
by Fish Hildreth
Cary & Jenney Attys.

June 20, 1939. A. C. ABRAMS 2,163,443
GRINDING WHEEL RECIPROCATING MECHANISM
Filed Nov. 14, 1935 2 Sheets-Sheet 2
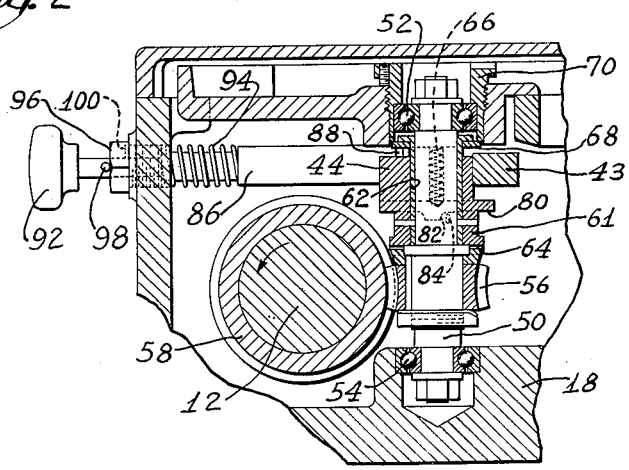
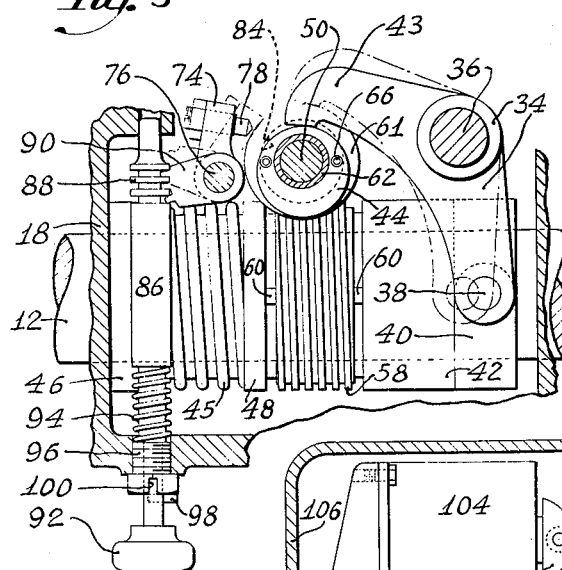
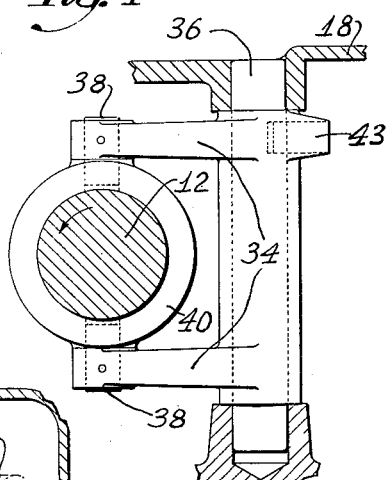
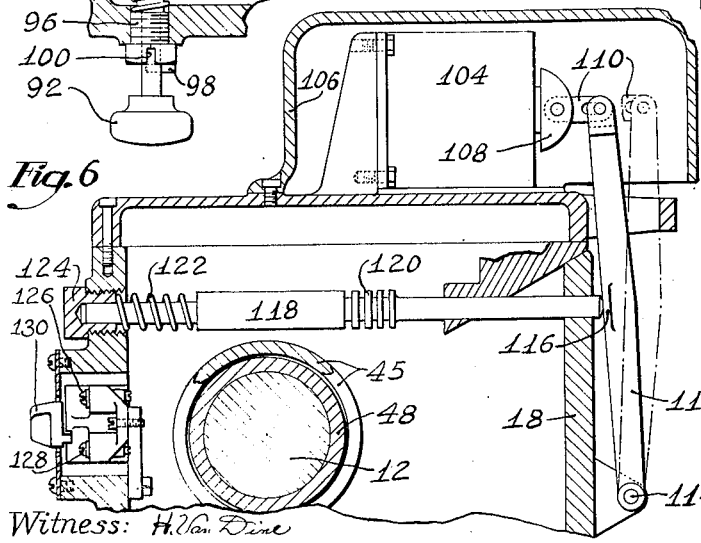
Witness: H. Van Dine
Inventor
Allan C. Abrams
by Fish Hildreth
Cary & Jenney Attys.

Patented June 20, 1939

2,163,443

UNITED STATES PATENT OFFICE 2,163,443

GRINDING WHEEL RECIPROCATING MECHANISM

Allan C. Abrams, Providence, R. I., assignor to Brown and Sharpe Manufacturing Company, a corporation of Rhode Island Application November 14, 1935, Serial No. 49,730

7 Claims. (Cl. 74—22)

The present invention relates to improvements in grinding wheel reciprocating mechanisms, and is herein disclosed as embodied in a spindle reciprocating mechanism of the general type which is driven by the rotational movement of the spindle and is provided with means for stopping the spindle reciprocation when so desired.

It is a principal object of the present invention to provide a novel and improved mechanism of this general description which is compact and efficient in construction and is particularly well adapted to be controlled either manually or by the operation of automatic devices to start and stop the reciprocating motion of the spindle.

With this and other objects in view as may hereinafter appear, a principal feature of the invention consists in the provision of a spindle reciprocating mechanism including automatic mechanism to start and stop spindle reciprocation, and means for controlling said automatic mechanism.

Another feature of the invention consists in the provision of a clutch in the spindle reciprocating mechanism, and automatic means for disengaging the clutch to stop spindle reciprocation with the spindle and grinding wheel carried thereby axially in a retracted position, so that the grinding wheel is located as nearly as possible to the spindle bearing to afford a support of maximum strength and rigidity for the wheel.

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a sectional view in front elevation of a grinding wheel spindle taken on a line extending downwardly through the wheel spindle carriage substantially through the axis of the grinding wheel spindle, only so much of the machine being disclosed as is necessary to illustrate the connection of the present invention therewith; Fig. 2 is a sectional view taken on the line 2—2 of Fig. 1, to illustrate particularly the connections for driving the reciprocating mechanism from the spindle and the manually operable control therefor; Fig. 3 is a plan view, partly in section, taken on the line 3—3 of Fig. 1; Fig. 4 is a sectional view taken on the line 4—4 of Fig. 1; Fig. 5 is an enlarged detail view of the reciprocation clutch disengaging and stop cam and detent recess shown in dotted lines in Fig. 2 as viewed from the opposite side; and Fig. 6 is an enlarged detail view similar to Fig. 2 illustrating an alternative construction including an automatic solenoid control for starting and stopping the spindle reciprocation.

The invention is herein disclosed as embodied in a grinding machine of the general description set forth in a copending application of Mathewson and Krause, filed of even date herewith.

A grinding wheel of ordinary description is illustrated at 10 in Fig. 1, carried on a spindle 12 which is mounted for rotational and axial movements in bearings 14 and 16 on a wheel spindle carriage 18. As more fully set forth in the copending application above referred to, the carriage 18 is supported to move toward and away from the work on ways 20 and 22 formed on the base 24 of the machine. The spindle 12 and grinding wheel 10 are continuously driven from an electric motor, generally indicated at 26 in Fig. 1, through a belt and pulley drive which includes a series of belts 28 arranged to ride in grooves formed respectively in a pulley 30 carried on one end of the spindle 12 and in a corresponding pulley 32 carried on the armature shaft of the motor 26.

For imparting axial movements to the spindle, there is provided a reciprocating member 34 which comprises a sleeve portion supported on a vertical pivot shaft 36, and two parallel arms extending therefrom which are connected by means of pins 38 to a ring or collar 40 which is loosely sleeved on the grinding wheel spindle 12 to engage against an abutting portion of a sleeve member 42 secured to the spindle. There is also formed integrally with the sleeve portion of the reciprocating member 34, a cam lever arm 43 which is provided at its tip with a bearing surface to engage with an actuating cam 44, so that as the lever arm rides from the low onto the high portion of the cam, a driving impulse is imparted to the spindle in an axial direction to the left as viewed in Fig. 1. A heavy compression spring 45 coiled about the spindle operates as a return spring. The spring 45 is supported at one end against a shoulder formed on a collar 46 which is in turn supported against an adjacent portion of the stationary bearing 14, and at its other end engages a corresponding shoulder formed on a sleeve member 48 secured to move axially with the spindle 12, so that the spindle is forced axially to the right, as viewed in Fig. 1, to maintain the sleeve member 42 in engagement with the ring 40 and the cam lever in engagement with the actuating cam 44.

The cam 44 is driven at a relatively slow rate from the rapidly rotating spindle through connections which comprise a vertically arranged drive shaft 50 supported at its upper end in a bearing 52 and at its lower end in a bearing 54 on the wheel spindle carriage 18. The shaft 50 is continuously driven from the spindle by means of a worm gear 56 rigidly secured to the shaft and a driving worm 58 which is sleeved on the spindle 12. The worm 58 and sleeve member 48 are splined to turn with the spindle by means of pins 60 supported respectively on the sleeve member 42 secured to the spindle as above pointed out, and on the sleeve member 48, which engage respectively in slots formed in the adjoining ends of the worm 58. The collar 46 is splined to the sleeve 48 by the engagement of a tongue formed on the collar with a corresponding slot in the sleeve 48.

The cam 44 forms part of a sleeve member 61 which is loosely mounted on the continuously driven shaft 50, and is arranged to be connected thereto by means of a spindle reciprocating starting and stopping clutch. The sleeve member 61 is keyed to a sleeve bushing 62 loosely mounted for rotational and axial movements with relation to the shaft 50, and has formed on the lower end thereof a clutch member 64 adapted for engagement with a corresponding clutch member formed on the upper face of the worm gear member 56. Two compression springs 66 seated within recesses formed in the cam sleeve 61, and arranged at their upper ends to engage with a ring 68 supported against the flanged upper end of the sleeve bushing 62, and against the lower end of a supporting collar 70 for the shaft bearing 52, act normally to force the cam sleeve 61 downwardly to engage the clutch.

In accordance with the present invention, mechanism is provided which acts, when rendered operative, to disengage the clutch and to stop the rotation of the actuating cam 44 in a predetermined angular position, to stop the reciprocation of the spindle with the spindle and the grinding wheel carried thereby in a fully retracted position so that the spindle may receive a maximum amount of support from the spindle bearing 14. The mechanism for disengaging the clutch specifically comprises a clutch lever 74 (see Fig. 3) which is rigidly secured to a vertically extending rock shaft 76 and is provided with a clutch pin 78 arranged to engage with a clutch face cam 80 (see Figs. 2, 3 and 5) formed on the came sleeve member 61 directly beneath the actuating cam 44. In operation the actuation of the clutch lever 74 and pin 78 causes the pin to move against the cam sleeve 61 and thereafter into engagement with the low portion of the cam surface 80 when this low portion of the cam comes opposite the pin, thus permitting the final movement of the pin and lever into operating position. The continued rotation of the cam sleeve 61 now causes the pin 78 to ride against the high portion of the cam 80 so that the sleeve 61 is raised to disengage the clutch.

In order to provide a definite stop position for the cam sleeve 61 and cam 44 which will correspond to a fully retracted position of the spindle 12, the cam 80 is provided with a stop surface 82 which engages with the pin to provide a positive stop against further movement of the cam 44. There is also provided on the peripheral surface of the cam sleeve 61 a recess 84 which is arranged to be engaged by a correspondingly tapered tip portion of the pin 78 to lock the cam yieldingly in desired stop position. In starting the spindle reciprocation, the cam lever 74 and pin 78 are moved out of engagement with the face cam 80 so that the cam sleeve 61 is permitted to move downwardly under the pressure of the springs 66 to engage the clutch.

The position of the clutch lever 74 to start or stop spindle reciprocation may be controlled manually as illustrated in Figs. 2 and 3, by means of an axially movable control shaft 86 which is provided adjacent its rear end with a cylindrical rack 88 which is arranged for engagement with a gear segment formed on a lever arm 90 secured to the rock shaft 76. At its other end the control shaft 86 is provided with a hand knob 92 controlled by the operator. A compression spring 94 coiled about a reduced portion of the control shaft 86 between a shoulder formed thereon and a sleeve nut 96 through which the shaft extends, tend normally to move the control shaft 86 axially to the right, as viewed in Fig. 2 to disengage the clutch. In order to permit the operator conveniently to control the position of the control shaft and clutch lever 74, a detent pin 98 is secured to the outer portion of the control shaft 86 adjacent the knob 92 and is arranged to ride into a slot 100 formed in the nut 96. When it is desired to engage the clutch, the operator has merely to pull the knob 92 outwardly moving the control shaft 86 against the pressure of the spring 94 so that the clutch lever 74 and pin 78 are moved out of engagement with the face cam 80. The knob 92 and shaft 86 are then rotated slightly to move the detent pin 98 out of alignment with the slot 100 so that the parts are locked in running position. In order to stop reciprocation, the operator merely turns the knob sufficiently to bring the pin 98 into alignment with the slot 100 so that the control shaft 86 is permitted to move rearwardly under the pressure of its spring 94 to engage the clutch lever 74 and pin 78 in the path of the rise on the face cam 80.

The mechanism above described for starting and stopping spindle reciprocation, is particularly constructed and arranged for control through the operation of automatic devices to start and stop spindle reciprocation, either separately by means of a conveniently located remote control, or simultaneously with the shifting of certain controls for other operating units of the machine as more fully set forth in the copending application above referred to. Fig. 6 of the drawings illustrates in a preferred form an automatic control device for controlling the position of the spindle reciprocating clutch which comprises a solenoid 104 mounted in a casing 106 on the spindle carriage 18 directly above the spindle 12. The solenoid armature generally indicated at 108 is connected by means of a short link 110 to one end of a vertically extending lever arm 112 which is secured at its lower end to a pivot 114 on the spindle carriage. The lever 112 is also provided with a bearing surface 116 which is arranged for engagement with one end of an axially movable control rod 118 which performs substantially the same function as the manually operable control rod 86 above described, to control the shifting of the clutch. The control rod 118 is provided with a cylindrical rack 120 which meshes with the gear segment formed on the clutch lever arm 90, and is normally moved to the right to disengage the clutch as above described, by means of a compression spring 122 coiled about a reduced portion of the control shaft 118 between a shoulder formed thereon and a nut 124 which is recessed to provide a bearing for one end of the shaft 118. The energizing of the solenoid causes the solenoid armature 108 to be moved to the left to the position shown in Fig. 6, so that the lever 112 engages with and forces the control rod 118 to the left against the pressure of the spring 122, to move the clutch lever 74 and pin 78 out of engagement with the face cam 80 to permit the engagement of the clutch. When the solenoid is again deenergized, the control rod 108 is permitted to move to the right under the pressure of its spring 122, causing the lever 112 to move to the dot-and-dash position shown in Fig. 6, while the clutch lever 74 and pin 78 are moved into the path of the cam 80 to again disengage the clutch and stop the spindle reciprocation.

For controlling the operation of the solenoid to start or stop spindle reciprocation as desired, a snap switch of ordinary construction is illustrated in Fig. 6, comprising contacts 126 and 128 and a hand knob 130 cooperating therewith having spindle reciprocation start and stop positions in which the circuit for energizing the solenoid is alternately closed or opened.

The invention having been described, what is claimed is:—

1. In a spindle reciprocating mechanism for a grinding machine including a grinding wheel, a power driven grinding wheel spindle and supporting bearings for the spindle, the combination of a spindle reciprocating member, driving connections for driving said member from the spindle at a reduced rate, a clutch in said connections for disconnecting said member from its driving connections to arrest spindle reciprocation, and control means for said clutch comprising cam and follower elements associated with said clutch acting when rendered operative to cause the disengagement of the clutch.

2. In a spindle reciprocating mechanism for a grinding machine including a grinding wheel, a power driven grinding wheel spindle and supporting bearings for the spindle, the combination of a spindle reciprocating member, driving connections for driving said member from the spindle at a reduced rate including a starting and stopping clutch, a clutch throw-out cam associated with said clutch, a clutch control lever, and a clutch throw-out member thereon arranged to be moved into the path of the cam to disengage the clutch.

3. In a spindle reciprocating mechanism for a grinding machine including a grinding wheel, a power driven grinding wheel spindle and supporting bearings for the spindle, the combination of a spindle reciprocating member, driving connections for driving said member from the spindle at a reduced rate, including driving and driven clutch members, a clutch throw-out cam associated with said driven clutch member, a clutch throw-out pin arranged for movement to a predetermined position in the path of the cam, said cam and throw-out member being arranged to disengage and stop said driven clutch member at a predetermined axial position of said reciprocating member and spindle with the grinding wheel at the limit of its movement toward the bearings.

4. In a spindle reciprocating mechanism for a grinding machine including a grinding wheel, a power driven grinding wheel spindle and supporting bearings for the spindle, the combination of a spindle reciprocating cam, a cam follower connected to impart reciprocatory movements to the spindle, driving connections for driving the reciprocating cam from the spindle including a driving clutch element, a driven clutch element connected to the reciprocating cam, a clutch throw-out and stop cam associated with said driven clutch member, a clutch throw-out pin arranged for movement to a predetermined operating position in the path of the cam, spring means tending to engage the clutch, and means under the control of the operator to move the pin into and out of operating position.

5. In a spindle reciprocating mechanism for a grinding machine including a grinding wheel, a power driven grinding wheel spindle and supporting bearings for the spindle, the combination of driving and driven clutch members, a spindle reciprocating cam driven thereby, a reciprocating lever actuated by the cam and connected to impart reciprocatory movements to the spindle, a clutch throw-out cam associated with the driven clutch member having formed therein a stop abutment and a stop recess, a clutch control lever, and a spring-seated throw-out pin carried on said lever arranged to be inserted in the path of said cam to disengage and stop the driven clutch member, and for spring-pressed engagement in said recess to maintain said driven parts in a predetermined stop position.

6. In a spindle reciprocating mechanism for a grinding machine including a grinding wheel, a power driven grinding wheel spindle and supporting bearings for the spindle, the combination of a reciprocating member connected to the spindle to impart reciprocatory movements thereto, driving connections for driving said member from the spindle at a reduced rate including driving and driven clutch members, a clutch throw-out device comprising cam and follower elements associated with said driven clutch member actuated by the rotation of the clutch member to disengage the clutch, and electrical connections acting when rendered operative for actuating said control device alternatively to engage and to disengage the clutch.

7. In a spindle reciprocating mechanism for a grinding machine including a grinding wheel, a power driven grinding wheel spindle and supporting bearings for the spindle, the combination of a spindle reciprocating member, driving connections for driving said member from the spindle at a reduced rate including driving and driven clutch members, a spindle reciprocating lever, a cam for actuating said lever, a clutch throw-out cam associated with said driven clutch member having formed therein a stop abutment and a stop recess, a clutch control lever, a spring-seated throw-out pin carried on said lever arranged to be inserted in the path of said cam to disengage and stop the driven clutch member, and for spring-pressed engagement in said recess to maintain said parts in a predetermined stop position, and electrical connections comprising a solenoid connected to actuate said control lever to disengage the clutch.

ALLAN C. ABRAMS.